United States Patent [19]
Taylor et al.

[11] Patent Number: 5,413,205
[45] Date of Patent: May 9, 1995

[54] EARLY BAG STORAGE SYSTEM

[75] Inventors: Ronald K. Taylor, Milton Keynes, United Kingdom; Donald L. Anderson, Brighton, Mich.

[73] Assignee: Jervis B. Webb Company, Farmington Hills, Mich.

[21] Appl. No.: 135,464

[22] Filed: Oct. 13, 1993

[51] Int. Cl.⁶ .............................................. B65G 37/00
[52] U.S. Cl. .................................. 198/358; 198/349; 198/349.7
[58] Field of Search ............... 198/349, 358, 349.4, 198/349.5, 349.6, 349.7

[56] References Cited

U.S. PATENT DOCUMENTS

| | | |
|---|---|---|
| 3,260,344 | 7/1966 | Vander Meer . |
| 3,610,159 | 10/1971 | Fickenscher ............... 198/349 X |
| 3,776,395 | 12/1973 | Lingg et al. . |
| 4,392,767 | 7/1983 | Ischebeck ............... 198/349.7 X |
| 5,056,047 | 10/1991 | Rosenbaum . |
| 5,072,822 | 12/1991 | Smith ......................... 198/358 X |

FOREIGN PATENT DOCUMENTS

| | | | |
|---|---|---|---|
| 3935598 | 5/1990 | Germany | 198/358 |
| 0275914 | 11/1987 | Japan | 198/358 |
| 1384593 | 2/1975 | United Kingdom | 198/349.6 |
| 1454859 | 11/1976 | United Kingdom | 198/358 |
| 0363646 | 12/1972 | U.S.S.R. | 198/349.6 |

Primary Examiner—James R. Bidwell
Attorney, Agent, or Firm—Dickinson, Wright, Moon, Van Dusen & Freeman

[57] ABSTRACT

A system for the storage of early baggage includes a storage conveyor for receiving early bags from the baggage handling system, for example, of an airport and for discharging the early bags onto said baggage handling system. The storage conveyor is arranged in a serpentine fashion for efficient use of horizontal space and includes evenly spaced entry and discharge stations. The system can deliver bags to the baggage handling system in a selected period of time to account for changes in flight departure times or changes in a passenger's travel plans.

9 Claims, 3 Drawing Sheets

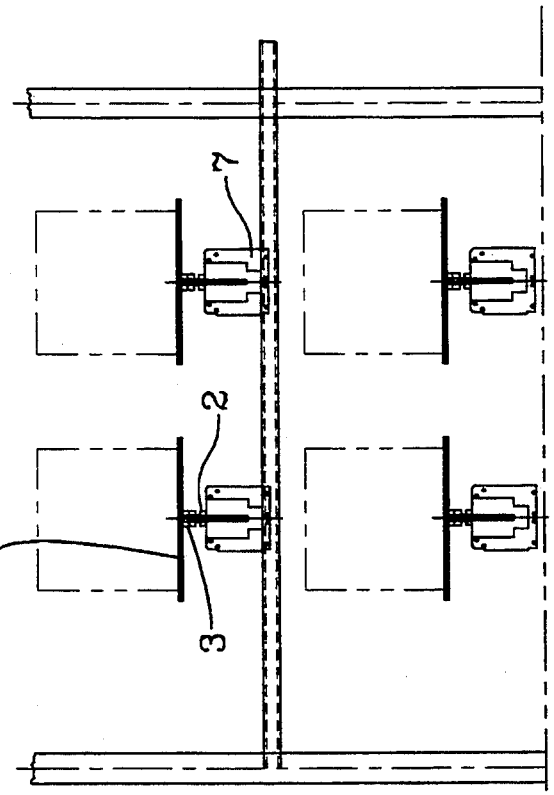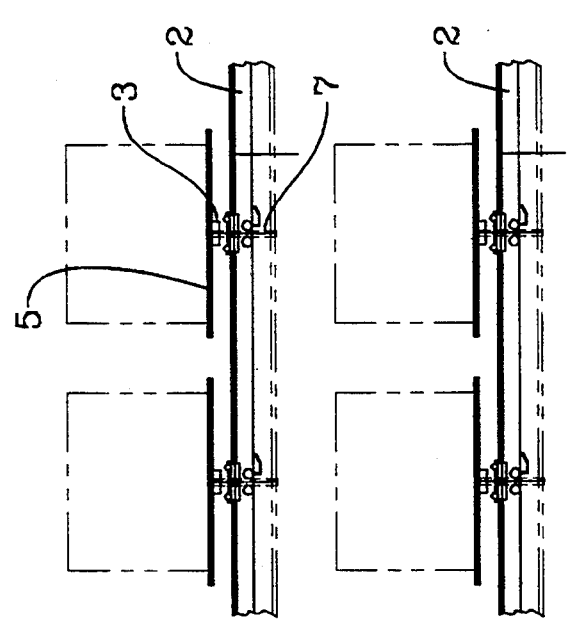

EARLY BAG STORAGE SYSTEM

TECHNICAL FIELD

This invention relates to the art of systems for the discrete storage and retrieval of baggage on demand. In the preferred embodiment, the invention is a system for the storage of "early" bags. As used herein, the term "early bag" means a baggage item that enters the baggage handling system of an airport prior to the time it can be received at the make-up area of its departing flight.

BACKGROUND

An airline traveller often has to change airplanes at an intermediate airport. In these cases, a baggage handling group at the airport unloads baggage from the incoming flight and transfers it to the departing flight so that the baggage will arrive at the same destination as does the traveller. This operation can become somewhat complicated because there will be several flights connecting with the incoming flight, and the departure times of the connecting flights vary. In those situations where the connecting flight is being "made up" when the incoming flight arrives, the bags can simply be transferred to the connecting flight. In those situations where the connecting flight is not yet being made up the bags are called "early bags", and they must be stored until the make-up of the connecting flight is "opened."

At the typical airport, the make-up for a flight is opened 5 about two hours prior to the scheduled departure time of the flight. Thus, a bag arriving at the airport more than two hours prior to the scheduled departure time of the connecting flight is defined to be an early bag. Larger airports may require storage of up to 4000 early bags, and these bags can be from one-half hour to 24 hours early.

Presently, one preferred method for storing early bags is to load the bags onto carts and to place the carts in a storage area until a make-up is opened. The bags are then removed from the carts and placed on the airport's baggage conveyor system. This is a very labor-intensive and inefficient system. Another known method is to provide the conveyor system with storage lanes for the early bags. Thus, bags for flights having make-up times within a certain period of time can be loaded onto a storage lane and discharged into the conveyor system when that time period has expired. A problem with this system is that the opening time of a flight can change, which means that all of the bags originally arranged to be discharged into the conveyor system at a particular time must be physically retrieved and reordered. Or, a passenger can decide to change plans and request that his bag be provided to him, which requires a worker physically to search the storage lane for the bag.

SUMMARY OF THE INVENTION

In accordance with the invention, an early bag storage system comprises one or more endless storage conveyors that communicate with the main conveyor system but are essentially separate from it. Each storage conveyor consists of a plurality of baggage supporting trays arranged in end-to-end, endless fashion. Each storage conveyor system has at least one entry station where early bags are diverted from the main conveyor and loaded onto the trays of an early bag storage conveyor. A computer records the destination of each bag and the opening time of the make-up area for that destination. If the scheduled opening of the make-up area is more than two hours after arrival of the bag, it will automatically be sent to an early bag storage conveyor. The storage system also has at least one discharge station for discharging a bag from each storage conveyor back onto the main conveyor.

In the preferred embodiment, each storage conveyor has a plurality of discharge stations that are evenly spaced along the storage conveyor. The spacing of the discharge stations is determined by the maximum time delay to be allowed for discharge of a bag. If only one discharge station is used, a bag will pass that station each time it makes a complete circuit. If the length of the circuit is small or the velocity of the storage conveyor high, the interval between the bag's passing the discharge station may be short enough to meet the needs of the airport. For example, it may be determined that the delay in discharging a bag should be fifteen minutes or less, and such can be obtained for a single discharge station only for rather short storage conveyors.

In the usual situation, however, the number of bags to be stored is large, which requires the storage conveyor to be rather long. If the conveyor moves at a preferred rate of about sixty feet per minute (60 FPM), the discharge stations may be as far apart as 900 feet and still provide the capability of discharging a bag within fifteen minutes of receipt of an instruction to do so. If the discharge stations are evenly separated by 900 feet, any bag on the storage system can be discharged within fifteen minutes without concern for the overall length of the storage conveyor.

Insertion conveyors are also preferably spaced around the storage conveyor to allow a bag to be placed on an empty tray within a maximum delay of fifteen minutes.

It is also often desirable to use more than one storage conveyor. For example, several such storage conveyor systems can be arranged to receive incoming bags under the control of a computer that keeps track of the number of bags on each storage conveyor system and directs incoming bags by a system of gates to the storage conveyor having excess capacity. The computer also controls the discharge of bags from the conveyors for delivery to their respective make-up areas, the various discharge stations being designed to communicate with the main conveyor system of the airport. This arrangement has the advantage of providing redundancy so that a breakdown of one of the conveyors does not disable the entire system.

Each storage conveyor preferably uses a plurality of trays, which may be arranged in plural, vertical levels, each of which receives a single bag. In one embodiment, 32"×36" wooden trays are arranged on the conveyor on 42" centers. This size will accommodate most bags, and large bags can be placed on two adjacent trays. The length of a bag is preferably measured by photoelectric elements as the bag is conveyed onto the insertion conveyor to allow the bag to be placed in the center of a tray, e.g., by using a shaft encoder to correlate the movement of the insertion conveyor to the position of the bag as determined by the photoelectric elements. If two trays are required, the center of the bag will be placed at the center of the two trays.

The trays are coded for identification and automatic reading by a scanner, or the like, and a supervisory computer maintains the correlation between a particular bag and a particular tray. The identification of a particular bag may be accomplished, for example, by laser scanning of pre-printed baggage tags having IATA 10 digit bar codes, as is known in the art, or manually entered by an operator. Identification of the trays is also accomplished by means known in the art.

The conveyor is preferably a known inverted, or overhead powered conveyor using a continuously moving chain. This conveyor is inexpensive and responsive and provides high density storage, especially with an overhead conveyor having carriers that are each provided with multiple, vertically spaced shelves.

BRIEF DESCRIPTION OF THE DRAWINGS

FIG. 2a is a side elevation view of a portion of a two-level early baggage storage conveyor system in accordance with the invention.

FIG. 2b is a transverse elevation view of the system of FIG. 2a.

DETAILED DESCRIPTION OF THE INVENTION

Figure 1:
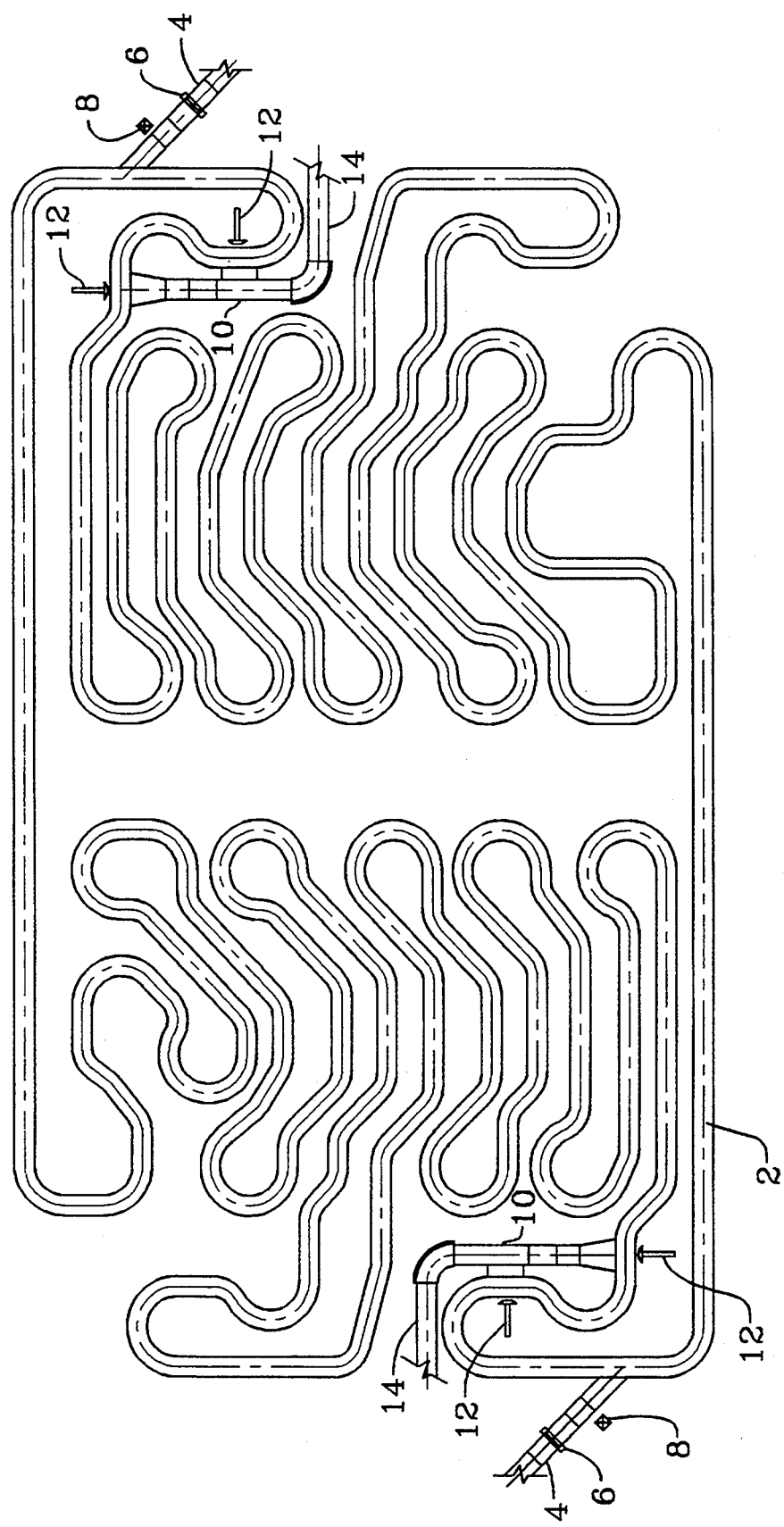
FIG. 1 is a schematic plan view of one loop of an early baggage storage conveyor system in accordance with the invention.

With reference to FIG. 1, an early baggage storage system comprises at least one conveyor 2 that carries a plurality of trays (see FIGS. 2a and 2b), each of which can accept a single bag. The conveyor is preferably an inverted, power only conveyor of known construction and is arranged in a serpentine fashion to maximize the length of the conveyor with respect to the floor area covered by the conveyor. The conveyor preferably carries the trays at a rate of about sixty feet per minute.

The early bags are supplied to the early baggage storage conveyor by an induction conveyor 4 that communicates with the baggage handling system of the airport. The baggage handling system of the airport receives bags from ticket counters or from transfer baggage subsystems, where each bag is identified by scanning or manual entry. The overall baggage handling system includes a supervisory computer 16 that stores the identity of each bag, determines the opening time of the make-up for the flight on which the bag is to be carried, and determines from the arrival time and the opening time whether the bag is an early bag. The system is controlled to supply the early bags to the early baggage storage conveyor induction conveyor 4. The induction conveyor 4 includes a scanner station 6 that includes a scanner for identifying the particular bag and photoelectric elements for measuring the length of the bag. A manual entry keyboard is also provided adjacent each of the induction conveyors to allow manual entry of the data if automatic scanning is not possible for a particular bag. The length and identification of the bag is supplied to an early baggage conveyor controller 18 that operates the induction device to load each bag onto a tray. If the bag is too large for a single tray, the bag is loaded onto two trays.

Preferably, the bags are loaded onto the center of the trays, and this is accomplished by controlling the movement of the induction conveyor 4 with respect to the movement of the early baggage conveyor 2, knowing the length of the bag from the outputs of the photoelectric elements.

The system includes discharge stations 10 that include discharge pushers 12 for unloading an early bag onto a take away conveyor 14 for return to the airport's baggage handling system. It should be noted that the discharge pushers 12 for each discharge station 10 are illustrated in FIG. 1 in alternative positions, it being necessary to have only a single discharge pusher at each discharge station.

The dimensions of the early baggage conveyor 2 and the capacities of the induction and take away conveyors are to be determined for each installation. In a preferred embodiment, however, the induction and take away conveyors are designed to carry about seventeen bags per minute, and a particular tray will be in a position to discharge (or receive, if empty) a bag every fifteen minutes.

In addition, an early baggage system may comprise a plurality of the systems illustrated in FIG. 1. Such a system is illustrated in FIGS. 2a and 2b. In the system of FIGS. 2a and 2b, two conveyors 2 are arranged on each of a plurality of vertically spaced levels to provide increased baggage storage capacity for a given horizontal area of airport space. Each of the conveyors 2 includes a plurality of trolleys 3 in known fashion, and each of the trolleys in turn carries a tray 5 for supporting a piece of baggage, which is illustrated in broken lines on each of the trays. An identification plate 7 is carried by each of the trays in such a position that a scanner can detect an identification symbol on the tray for ascertaining the identity of that particular tray. The scanner may be of several known types, including optical, microwave, electronic, or the like. Other identification systems can be used, as well. In the case illustrated in FIGS. 2a and 2b, the overall baggage handling system of the airport would be designed to supply early bags to any of the induction conveyors attached to a conveyor 2 on any of the levels and to receive bags from take away conveyors associated with each of the storage conveyors. The early baggage conveyors may be stacked vertically as illustrated in FIGS. 2a and 2b, arranged side-by-side horizontally, or both, to maximize the storage capability for any given area available in the airport.

Figure 3:
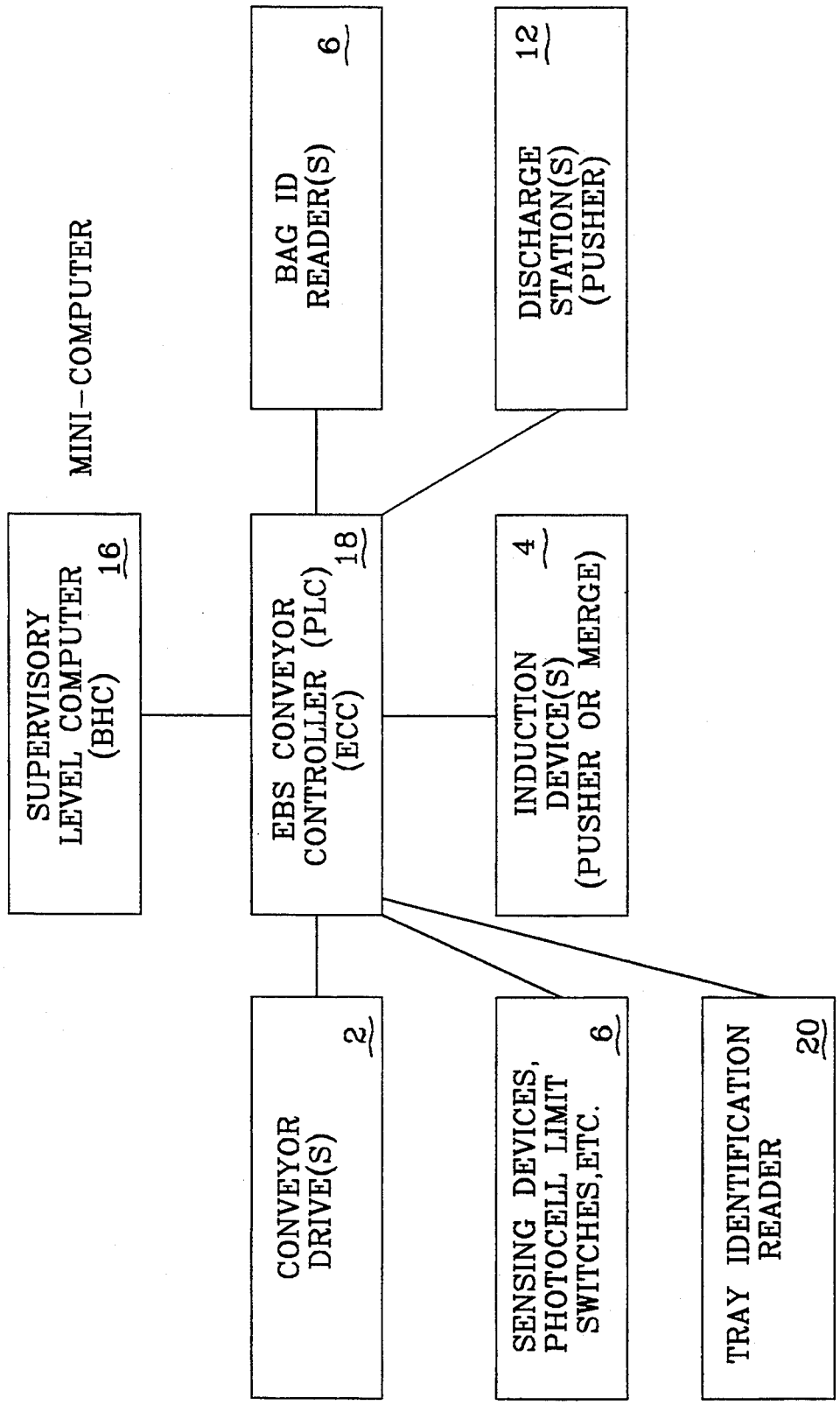
FIG. 3 is a block diagram showing a preferred control system for an early baggage storage system in accordance with the invention.

FIG. 3 illustrates a control system for a baggage handling system in accordance with the invention. The system includes a supervisory computer 16, which stores information about all of the baggage in the system and all of the flights. Baggage entering the system is identified, for example, by scanning the baggage tags, and the flight information for that bag can be ascertained from the flight information display system (F.I.D.), which is interfaced with the supervisory computer. The supervisory computer 18 determines which of the bags in the baggage handling system is an early bag, e.g., by comparison of the time of arrival of the bag with the expected departure time of the flight on which the bag will be loaded.

An early baggage system conveyor controller 18 controls each early baggage system conveyor. This controller receives information about the bags to be loaded onto the early baggage storage conveyor from the supervisory computer 16 and confirms the identity of each bag actually entering the early baggage storage system by data received from the scanner 6. The conveyor controller 18 controls the induction conveyor 4 to load a particular bag onto a particular tray in the desired configuration, records the identity of the tray on which the particular bag is loaded as determined by a tray identification reader 20. The conveyor controller 18, correlates each particular bag with the particular tray carrying it as long as that bag is on the early baggage storage conveyor.

When the supervisory computer 16 determines that a bag is to be retrieved from the early baggage storage conveyor, for example, when the make-up area for the bag's departing flight has opened or a customer has called for his bag, it instructs the controller 18 to discharge that bag. The controller 18 then controls the discharge pushers 12 to discharge that particular bag from the early baggage storage conveyor to a take away conveyor, which carries it to the overall baggage handling system of the airport.

It will be appreciated that a unique system for the storage of early baggage has been disclosed. Modifications within the scope of the appended claims will be apparent to those of skill in the art.

We claim:

1. Apparatus for storing early bags arriving at an airport and discharging such stored early bags to a make-up operation for a desired departure flight, comprising:
   an endless storage conveyor having a plurality of baggage carriers, each having a tray adapted to receive one of said early bags, said tray being arranged in end-to-end endless fashion and supported for continuous recirculating movement on a path of travel defined by a conveyor track;
   induction conveyor means for loading each of said early bags onto a separate one of said baggage carriers;
   means for identifying each of said early bags and the said baggage carrier onto which it is loaded, and
   discharge means adjacent to a portion of said conveyor track for selectively removing early bags from baggage carriers passing said discharge means.

2. Apparatus according to claim 1 wherein said conveyor track is serpentine.

3. Apparatus according to claim 1 wherein said conveyor track comprises a plurality of vertically spaced tracks.

4. Apparatus according to claim 1 wherein said conveyor track comprises a plurality of horizontally arranged tracks.

5. Apparatus according to claim 1 further comprising a plurality of discharge stations evenly spaced along said conveyor track.

6. Apparatus according to claim 1 wherein said induction means receives said early bags from a baggage handling system, and said discharge means returns said early bags to said baggage handling system.

7. A method for storing early bags arriving at an airport and discharging such stored early bags to a make-up operation for a desired departure flight, comprising the steps of:
   providing a storage area for said early bags;
   installing in said storage area a continuously driven conveyor having a plurality of baggage carriers arranged in end-to-end endless fashion, each carrier comprising a tray adapted to receive one of said early bags and each supported for recirculating movement on a path of travel defined by a conveyor track;
   identifying each early bag and its departure flight and recording such information;
   providing means for identifying each of said baggage carriers; providing induction conveyor means adjacent to at least one portion of said path of travel of said baggage carriers for loading each of said identified early bags onto one of said baggage carriers of said conveyor passing by said induction conveyor means and recording the identity of that carrier;
   providing discharge station means adjacent to another portion of said path of travel of said baggage carriers for removing early bags therefrom;
   determining the opening time of said make-up operation for each departure flight; and
   selectively removing from said baggage carriers passing by said discharge station means early bags for each departure flight in response to said determining of the opening of said make-up operation thereof.

8. A method according to claim 7 wherein said discharge station means comprises at least two discharge stations substantially equally spaced apart along said conveyor track.

9. A method according to claim 7 wherein said induction conveyor means comprises a plurality of said induction conveyor means spaced apart along said conveyor track.

* * * * *